G. E. CASSEL.
CONTROLLING DEVICE FOR AUTOMOBILES.
APPLICATION FILED MAR. 26, 1918.
1,299,678.
Patented Apr. 8, 1919.
2 SHEETS—SHEET 1.
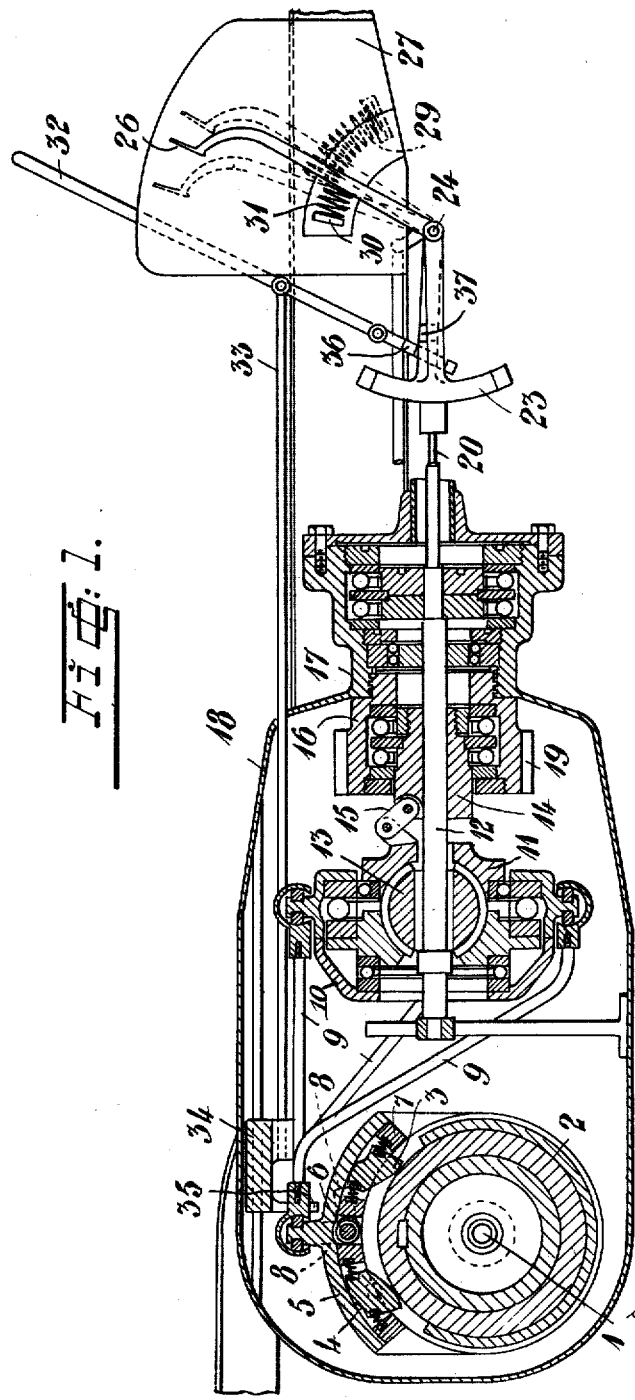

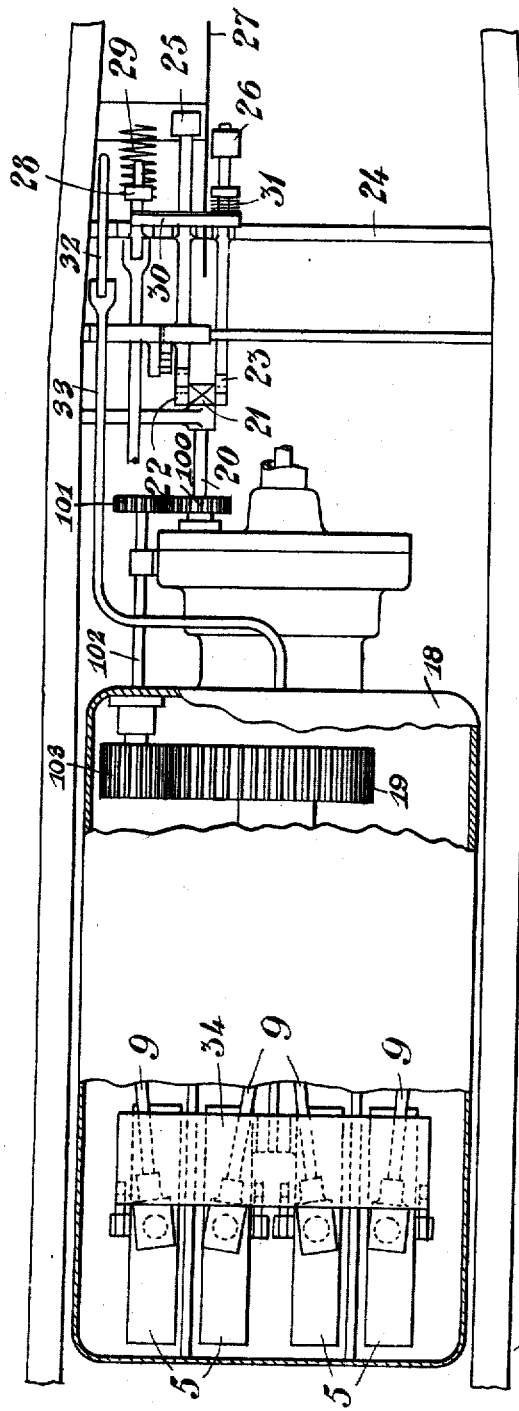

UNITED STATES PATENT OFFICE.

GUNNAR ELIAS CASSEL, OF STOCKHOLM, SWEDEN, ASSIGNOR TO ARTUR LORENZ OLOF ABRAHAM LEFFLER, OF DJURSHOLM, SWEDEN.

CONTROLLING DEVICE FOR AUTOMOBILES.

1,299,678.     Specification of Letters Patent.     Patented Apr. 8, 1919.

Application filed March 26, 1918. Serial No. 224,784.

*To all whom it may concern:*

Be it known that I, GUNNAR ELIAS CASSEL, a citizen of the Kingdom of Sweden, residing at Stockholm, Sweden, have invented new and useful Improvements in Controlling Devices for Automobiles, of which the following is a specification.

This invention relates to a controlling device for automobiles and similar vehicles of the kind in which the power transmission device between the power engine and the driven axle of the vehicle includes a number of clutches, which are operated by means of a thrust-disk, whereby a great ratio of gearing, adjustable within wide limits, may be obtained.

A controlling device for automobiles having a power transmission device of the said type should respond to the following conditions:

1. The device should make the use of reversing mechanisms of well known types as well as of friction clutch couplings of any type unnecessary, thereby not only rendering the machinery of the vehicle more simple, but also rendering the vehicle more reliable and more easily controlled.

2. The device should be so constructed that the forces or strains to be transferred through the clutches cannot at any time exceed certain previously determined values. This is necessary owing to the fact that the ratio of gearing of a power transmission device of the above said kind may be given any desired value, while, with respect to the resistance of the material, it should be avoided to drive the device at its extreme positions. Hence, the following further secondary conditions must be fulfilled:

*a.* The vehicle must not be started in any direction with the foot-brake applied;

*b.* The acceleration of the vehicle in the forward or reversed direction during the starting operation should be small.

3. The device should enable the alteration of the ratio of gearing to be effected in an easy manner while the vehicle is in motion.

This invention has for its object to provide a controlling device which responds to all of the aforesaid conditions. The invention is characterized, chiefly, in this that the control of the power transmission device for starting purposes, for adjustment of the ratio of gearing and for stopping the vehicle is effected by means of foot-pedals.

In the accompanying drawing, one embodiment of the invention is illustrated.

Figure 1 shows a longitudinal section of the power transmission device and an elevation of the control device. Fig. 2 is a plan view of the devices shown in Fig. 1, some part of the power transmission device being removed.

The driven axle 1 of the vehicle carries a number of clutches, which in the preferred form consist of four friction ratchet gears, each of which involving a disk 2 keyed to the shaft 1, a friction pawl 3 operating on said disk for moving the vehicle in forward direction, and another friction pawl 4 operating on the disk for moving the vehicle backwardly. Said friction pawls are mounted with a slight play in an annular segment 5 mounted on the disk 2 to move concentrically thereto. Mounted in said annular segment is a frame 7 which may be moved circumferentially with respect to the segment by means of a cam disk 6 in order to bring the one friction pawl or the other into operative position. To enable the operation of the cam disk, the shaft thereof extends through the one side wall of the segment 5 and carries outside thereof two radial projections 8, preferably at right angles to each other.

The annular segments 5 of the four friction ratchet gears are connected by means of rods 9 with a thrust-ring 10 at points situated at equal distances apart on the periphery of the ring. Said ring 10 is by means of ball bearings or the like mounted on a thrust-disk 11, mounted in turn on a transverse cylindrical or spherical member 13 keyed to the power shaft 12, as for instance a motor shaft, and provided with a circumferential flange situated in a plane through the axis of the shaft 12 and engaging a corresponding slot formed in the disk 11, thereby causing the disk 11 to revolve with the shaft 12, while permitting it to turn around an axis perpendicular to the axis of the shaft 12. By setting the disk 11 at an oblique angle to the axis of the driving shaft 12, the thrust-ring 10, the rotation of which is prevented by means not shown in the drawing, is caused to vibrate back and forth with a wabbling or gyrating movement. Said movement is through rods 9 imparted to the annular segments 5 which will thus oscillate back and forth, concentrically to the disks 2.

The adjustment and locking of the thrust disk 11 in an oblique position with respect to the shaft 12 is effected by means of a hub 14 slidably, but not rotatably mounted on the shaft 12, and connected by means of a link 15 to the thrust-disk 11. To displace the hub on the shaft 12, a thrust ball bearing is provided between the hub and a sleeve 16, formed on its outer circumferential surface with screw-threads engaging a correspondingly threaded portion 17 of a stationary casing 18, inclosing the power transmission devices, so that the sleeve 16 together with the hub 14 may be displaced longitudinally in either direction by turning the sleeve 16. The turning of the said sleeve may, for instance, be effected by means of a control shaft 20, provided with a pinion 100 in mesh with a pinion 101 on a shaft 102 which carries a pinion 103 meshing with teeth 19 formed on the said sleeve 16.

The shaft 20 also carries a pinion 21 meshing at diametrically opposite points with two toothed segments 22, 23 mounted on a pivot 24, and each connected with a pedal 25 and 26, respectively. The pedal 25 is adapted for starting and increasing the speed of the vehicle, while the pedal 26 is adapted for decreasing the speed of the vehicle and for stopping the same. Disposed between said pedals is a partition wall 27. Provided at the same side of said wall as the pedal 25 is a brake-pedal 28 controlling a band brake (not shown) on the driven axle 1 of the vehicle and if desired, also controlling a brake (not shown) on the shaft 12. The brake pedal 28 is acted upon by a spring 29 tending to keep the pedal in raised position in which the brake or the brakes are released. By means of a transversely extending bar 30 rigidly attached to the brake-pedal 28 and extending through an opening in the wall 27, and a spring 31 situated between the said bar and the pedal 26, the pedals 26 and 28 are connected with each other in such a way that the brake pedal 28, will, when operated, bring the pedal 26 with it, while the pedals are entirely independent of each other with respect to all other movements. The brake-pedal 28 will thus not operate the pedal 26 in its raising movement and the pedal 26 may be operated entirely independent of the brake-pedal 28.

To reverse the direction of movement of the vehicle, a hand-lever 32 is provided, which by means of a link 33 is connected to a longitudinally movable slide 34, situated above the clutch mechanism and having two projections 35, adapted to coöperate with the projections 8 of the cam disks 6 in order to bring the friction pawls 3 operating for the forward direction of movement, or the friction pawls 4 operating for the reversed direction of movement, into operative position. To prevent the friction pawls 3 or 4 from being locked when the reversing operation is to take place, which would otherwise prevent the reversing action, the said action must take place while the clutch mechanism is in motion. Said movement, however, must not be larger than is necessary to secure a slight movement of the friction pawls, as otherwise breakage of the clutch mechanism would occur as the reversing operation takes place. To this end provisions are made, whereby the lever 32 can be shifted only in a certain position of the pedal 26, viz. in a position corresponding to a very slow turning of the disks 2 of the clutch mechanism. This effect is obtained by providing the lever 32 with a lateral opening 36 or a fork through which a projection 37 of the arm carrying the toothed segment 23 connected to the pedal 26 must pass as the lever is shifted: The projection 37 and the opening 36 are so positioned as to enable the shifting of the lever only when the pedal 26 is in the position above stated.

Assuming the operation of the clutch mechanism and of the thrust-disk to be well-known, the operation of the controlling device is as follows: When the pedal 25 is depressed, the shaft 20 and, consequently, also the sleeve 16 will be turned in such a direction as to move the hub 14 to the left, thereby setting the thrust-disk 11 at a more oblique angle to the axis of the shaft 12 according as the pedal is depressed. This will in well-known manner effect a successive increase of the speed of the disk 2 and the shaft 1. When the pedal 26 is depressed, the hub 14 will be moved to the right, thereby successively returning the thrust-disk 10 to a position at right angle to the shaft 12 which position will be reached when the pedal 26 is completed depressed. When the brake pedal 28 is depressed the shaft 1 and, eventually, also the shaft 12 will be braked. By shifting the lever in forward direction, the friction pawls 3 will be set in operative position, and by shifting the lever 32 in the opposite direction, the friction pawls 4 will be made operative.

While the vehicle is in motion, the operator normally holds one of his feet on the brake pedal 28 and the other on the pedal 26. If he wishes to suddenly stop the vehicle, he depresses both of the pedals thereby braking the vehicle and eventually, also the motor, and moving the thrust-disk 10 to a position at right angles to the shaft 12 so that the transfer of power through the rods 9 will cease. If the operator forgets to depress the pedal 26 sufficiently, the depressing of the pedal 26 is completed by the pedal 28 on account of the above described connection between said pedals. Thus, any braking operation cannot be effected while the clutch mechanism is in operation and, consequently, undue stresses on the clutch mechanism due to the braking action will be obviated.

If the vehicle is stopped, while moving on a horizontal road, it will, of course, stand still, even if the brake pedal 26 be released.

If the vehicle is stopped on a hill, it will be braked by the friction pawls 3 being pressed against the disks 2 at any tendency of backward movement thereof. The vehicle cannot thus move backwardly, if the brake pedal be released, and will, consequently, also in such case stand still.

If, however, the vehicle is stopped on a downhill, it will commence to move downwardly immediately as the pedal 28 is released. When a short stoppage only is concerned, during which it is not necessary for the operator to leave the vehicle, the pedal 28 may be kept depressed, until the vehicle is to be started again. In longer stoppages, the vehicle after having been stopped by operating the brake-pedal, must be braked by means of the usual hand-brake (not shown), while the engine may, if desired, be stopped by shutting off the fuel supply. Said hand brake however, should be so feeble as to just be capable of preventing the vehicle from moving so that, if the operator would forget to release the hand brake before starting, the driving mechanism may be started without the risk of undue stresses thereon.

As soon as the vehicle comes to rest, the foot resting on the brake-pedal may be placed on the pedal 25, as the next operation in every case must be to start the vehicle in the forward or reversed direction of movement. In fact, the vehicle cannot be started again until after the foot has been removed from the pedal 28 and placed on the pedal 25 to depress same, as the latter cannot be depressed by the other foot on account of the wall 27 and the vehicle cannot be started but by depression of the pedal 25. Hence, starting of the vehicle with the foot-brake applied is impossible as the brake-pedal 28 on being released will be returned to its neutral position by the action of the spring 29, thus releasing the brake.

By depressing the pedal 25, the thrust-disk 11 is set at an angle to the shaft 12 thereby causing the thrust-ring to wabble and move the rods 9 back and forth. Said movement will to begin with be very small and will increase with the angle at which the thrust-disk is set with respect to the shaft 12. The starting operation will thus always be effected with the largest ratio of gearing, the ratio of gearing then successively decreasing according as the pedal 25 is depressed. This will prevent undue stresses in starting, which will thus be effected softly and without shocks.

Reversing of the vehicle is controlled, as already stated, by means of the hand-lever 32. To avoid undue stresses on the power transmission device it should be observed that the reversing operation must not be effected but while the vehicle is at rest. To permit the shifting of the hand-lever, however, the pedal 26 must be in a position corresponding to a slow movement of the annular segments 5, which movement must yet suffice to release the friction pawls that might be locked at the time. As the shaft of the engine normally makes, say, 20 revolutions per second, all of the friction pawls 3 adapted for driving the vehicle forwardly will be released when the hand-lever 32 has reached its central position and caused the cam disk to release the frame 7 thereby permitting it to be moved in its neutral position by the action of its springs in which position the friction pawls 3 and the friction pawls 4 are both inoperative even if said movement of the hand-lever may be completed in half a second. During said movement each friction pawl 3 will receive ten backwardly working impulses each of which is capable of releasing the pawls. During the turning of the hand-lever from its neutral position to its extreme position in backward direction, the friction pawls 4 are moved in operative position so that the vehicle will immediately commence to slowly move backwardly. This movement may be accelerated by depressing the pedal 25 and retarded by depressing the pedal 26 and entirely shut off by completely depressing the pedal 26 and at the same time depressing the brake-pedal 28. When it is desired to drive the vehicle forwardly, the pedal 25 should be slightly depressed to bring the pedal 26 in such a position as to permit the shifting of the lever 32 in forward direction. At this moment the vehicle is running exceedingly slowly in backward direction. As the hand-lever reaches its neutral position, said movement will cease due to the releasing of the friction pawls 4 in the same way as is described with reference to the reversing action, and in the continued forward movement of the hand-lever, the friction pawls 3 will again be made operative thus causing the vehicle to move exceedingly slowly in forward direction. Change of speed may then be effected in the manner already described.

The reversing operation above described will be true when the vehicle is moving on a horizontal road. If the vehicle be on a hill when the reversing operation is to take place, it will move freely downwardly as soon as the hand-lever is moved to its extreme backward position. Braking may however be effected by means of the foot-brake. If the foot-brake pedal 28 be depressed, the pedal 26 will also be depressed, and the hand-lever cannot thus be shifted unless the pedal 28 be released and the foot that depressed the pedal 28 be placed on the pedal 25 for depressing same. As, however, the hand-lever cannot be shifted but when the vehicle is at rest, any further controlling operation is prevented, and the vehicle will continue to move backwardly. To stop the vehicle and reverse the movement thereof, it is necessary to apply the band-brake. Only after the vehicle has been stopped in this way, the reversing action can be effected in the manner already described.

If the reversing action is to be effected while the vehicle is running on a downhill, the vehicle must be stopped by means of the hand-brake. After the reversing operation has been effected in the manner described and the vehicle shall again move forwardly, the vehicle on being stopped will be braked by the friction pawls 4, whereupon the reversing for the forward direction of movement may be effected as already described.

By the use of the controlling device above described, the operator may easily and without interfering perform all of the different operations required in power transmission devices of this class. It should be observed that the operator may entirely control the change of speed by his feet, leaving his hands free for steering. It will be seen, that under all circumstances any additional stress on the driving mechanism except the comparatively small stress resulting from the hand-brake may be obviated by attending to the single rule that the reversing lever may not be operated but while the vehicle is at rest. Attending to such rule, however, will not meet any difficulties, as it is a principal rule in all automobile driving.

Among modifications that may be made without departing from the invention, it should be stated that the brake pedal 28 may be omitted and the brake be operated directly from the pedal 26 in such a way as to be applied when the said pedal is in the position in which the clutch mechanism is out of operation. As the two pedals 25, 26 act upon a common toothed segment 23 and the pedal 26 will thus be raised at the depressing of the pedal 25 for starting, the brake will be automatically released in starting without the aid of any retracting springs. In such a case the partition wall 27 may be dispensed with and the operator may have his feet constantly resting on the same pedals.

Another modification consists in disposing the projection 37 coacting with the lever 32, on the arm of the toothed segment 22 instead of on the arm of the toothed segment 28.

What I claim, and desire to secure by Letters Patent of the United States, is as follows:

1. The combination in an automobile, of a driven axle, a number of clutches operating on said axle, a driving shaft, an obliquely-acting thrust-disk connected to said shaft for rotation therewith, a non-rotary thrust-ring loosely mounted on said thrust-disk for operating said clutches, and means for adjusting the said thrust-disk at different oblique angles with respect to said shaft, said means including a pedal for adjusting the disk so as to increase the speed of movement of the clutches, and another pedal for adjusting the thrust-disk so as to decrease said speed.

2. The combination in an automobile, of a driven axle, a number of clutches operating on said axle, a driving shaft, an obliquely-acting thrust-disk connected to said shaft for rotation therewith, a non-rotary thrust-ring loosely mounted on said thrust-disk, connections for imparting motion from said thrust-ring to said clutches, means for adjusting the thrust-disk at different oblique angles with respect to said shaft, said means including a pedal for increasing the speed of movement of the clutches, and another pedal for decreasing said speed, a brake operating pedal, so connected to the pedal for decreasing the speed of the clutches as to operate the same when depressed, the two pedals being independent of each other in all other respects.

3. The combination in an automobile, of a driven axle, a number of reversible clutches operating on said axle, means for reversing the clutches, a driving shaft, an obliquely acting thrust-disk connected thereto for rotation therewith, a non-rotary thrust-ring loosely mounted on said thrust-disk, connections for imparting motion from said thrust-ring to said clutches, means for adjusting the said thrust-disk at different oblique angles with respect to said shaft, said means being so connected to the reversing means for the clutches as to only permit the operation thereof in a position of the adjusting means corresponding to a slow movement of the clutches.

4. The combination in an automobile, of a driven axle, a number of reversible clutches operating on said axle, means for reversing said clutches, a hand-lever for operating said means, a driving shaft, an obliquely-acting thrust-disk thereon for rotation therewith, a non-rotary thrust-ring loosely mounted on said thrust-disk, connections for imparting motion from said thrust-ring to said clutches, means for adjusting said thrust-disk at different oblique angles with respect to said shaft, said means including independent pedals for increasing and decreasing the speed of movement of the clutches respectively, the said hand-lever being so mounted and arranged with relation to said pedals that it cannot be shifted but in a given position of said pedals corresponding to a slow movement of the clutches.

5. The combination in an automobile, of a driven axle, a number of reversible clutches operating on said axle, means for reversing the clutches, a hand-lever for operating said means, a driving shaft, an obliquely acting thrust-disk thereon for rotation therewith, a non-rotary thrust-ring loosely mounted on said thrust-disk, connections for imparting motion from said thrust-ring to said clutches, means for adjusting said thrust-disk at different oblique angles with respect to said shaft, said means including a turnable control shaft, a pinion on said shaft, toothed segments meshing with said pinion at opposite sides thereof and a pedal connected with each of said toothed segments, the reversing hand lever being so positioned and arranged with relation to said pedals that it cannot be shifted but in a definite position of said pedals corresponding to a slow movement of the clutches.

6. The combination in an automobile, of a driven axle, a number of clutches operating on said axle, a driving shaft, an obliquely acting thrust-disk thereon for rotation therewith, a non-rotary thrust-ring loosely mounted on said thrust-disk, connections for imparting motion from said thrust-ring to said clutches, means for adjusting the said thrust-disk at different oblique angles with respect to said shaft, said means including one pedal for increasing the speed of the clutches, and another pedal for decreasing said speed, a partition wall situated between said pedals to prevent operation thereof with the same feet, a brake pedal so connected with the pedal for decreasing the said speed as to move the same when depressed, said brake pedal being situated at the same side of said partition-wall as the pedal for decreasing the speed of the clutches.

In testimony whereof I have signed my name.

GUNNAR ELIAS CASSEL.

Copies of this patent may be obtained for five cents each, by addressing the "Commissioner of Patents, Washington, D. C."